United States Patent
Sharifi

(10) Patent No.: US 9,817,907 B1
(45) Date of Patent: Nov. 14, 2017

(54) USING PLACE OF ACCOMMODATION AS A SIGNAL FOR RANKING REVIEWS AND POINT OF INTEREST SEARCH RESULTS

(71) Applicant: Google Inc., Mountain View, CA (US)

(72) Inventor: Matthew Sharifi, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 463 days.

(21) Appl. No.: 14/308,012

(22) Filed: Jun. 18, 2014

(51) Int. Cl.
  *G06F 7/00* (2006.01)
  *G06F 17/00* (2006.01)
  *G06F 17/30* (2006.01)

(52) U.S. Cl.
  CPC ...... *G06F 17/3087* (2013.01); *G06F 17/3053* (2013.01)

(58) Field of Classification Search
  None
  See application file for complete search history.

(56) References Cited

U.S. PATENT DOCUMENTS

| | | | | |
|---|---|---|---|---|
| 5,948,040 A | * | 9/1999 | DeLorme | G01C 21/36 340/990 |
| 2004/0098287 A1 | * | 5/2004 | Young | G06Q 30/02 705/5 |
| 2007/0011034 A1 | * | 1/2007 | Jones | G06Q 10/02 705/6 |
| 2007/0143345 A1 | * | 6/2007 | Jones | G06F 17/30241 |
| 2008/0091482 A1 | * | 4/2008 | Whitsett | G06Q 10/025 705/6 |
| 2008/0133488 A1 | * | 6/2008 | Bandaru | G06F 17/30864 |
| 2009/0282019 A1 | * | 11/2009 | Galitsky | G06F 17/30634 |
| 2011/0090080 A1 | * | 4/2011 | Yu | G06Q 30/0201 340/539.13 |
| 2011/0113100 A1 | * | 5/2011 | Chawla | G06F 17/3087 709/205 |
| 2011/0167077 A1 | * | 7/2011 | Govani | G06F 17/3087 707/767 |
| 2011/0173217 A1 | * | 7/2011 | Kasperski | G06F 17/3087 707/767 |
| 2012/0221479 A1 | * | 8/2012 | Schneck, III | G06Q 30/0631 705/347 |
| 2013/0024391 A1 | * | 1/2013 | Vakil | G06Q 30/0282 705/319 |

(Continued)

OTHER PUBLICATIONS

TripAdvisor.com, Jan. 1, 2014 from Wayback machine.com. https://web.archive.org/web/20140101083855/http://www.tripadvisor.com/Hotel_Review-g34438-d1815254-Reviews-JW_Marriott_Marquis_Miami-Miami_Florida.html.*

*Primary Examiner* — Hasanul Mobin
(74) *Attorney, Agent, or Firm* — Dority & Manning, P.A.

(57) ABSTRACT

Systems and methods for using place of accommodation as a signal for ranking reviews and point of interest search results are provided. One example method includes receiving a search query from a user and identifying a place of accommodation at which the user is staying. The method includes determining a score for each of a plurality of points of interest according to a scoring formula. The scoring formula provides the score based on a plurality of reviews of each point of interest. Reviews provided by reviewers that were staying at the place of accommodation have a greater influence on the score than reviews provided by reviewers that were not staying at the place of accommodation. The method includes selecting one or more of the plurality of points of interest to provide as search results to the user based the plurality of scores.

17 Claims, 5 Drawing Sheets

(56) References Cited

U.S. PATENT DOCUMENTS

| | | | |
|---|---|---|---|
| 2014/0074873 A1* | 3/2014 | Ngo | G06F 17/30241 |
| | | | 707/758 |
| 2014/0114705 A1* | 4/2014 | Bashvitz | G06Q 50/14 |
| | | | 705/5 |
| 2014/0214548 A1* | 7/2014 | Faltings | G06F 17/30702 |
| | | | 705/14.66 |
| 2015/0262435 A1* | 9/2015 | Delong | G07C 5/0816 |
| | | | 340/439 |
| 2015/0286960 A1* | 10/2015 | Habibi | G06Q 10/02 |
| | | | 705/5 |

* cited by examiner

USING PLACE OF ACCOMMODATION AS A SIGNAL FOR RANKING REVIEWS AND POINT OF INTEREST SEARCH RESULTS

FIELD

The present disclosure relates generally to geographic information systems or other mapping applications. In particular, the present disclosure is directed to systems and methods for using place of accommodation as a signal for ranking reviews and point of interest search results.

BACKGROUND

A client device such as a smartphone or a laptop computer can operate a browser, mapping application, or a geographic information system to provide maps and/or other geographic information and data to a user. For example, a user can search a map for one or more generalized destinations. As another example, a map can be provided in response to a web search query that implicitly calls for geographic results, such as when the search may be satisfied by a plurality of points of interest respectively having physical locations. Generally, the client device can communicate with a server over a network in order to obtain the appropriate geographic information to provide to the user.

Furthermore, once relevant points of interest have been identified, the user can interact with the geographic information system to receive further information about a particular point of interest. For example, the user may select a restaurant or other place. In response, the geographic information system can provide the user with a summary of available information concerning the restaurant, such as, for example, pricing, reviews, hours of operation, a menu, location, contact information, or other useful information.

As an example, one instance in which mapping applications or other means for obtaining geographic information are particularly useful is when a user is exploring an area with which the user is relatively unfamiliar. For example, the user can be on vacation, work travel, or simply in an unfamiliar location within their home city. As a result, the user can use a mapping application to navigate about the area of exploration and receive other useful geographic information including, for example, recommendations of places to visit.

For example, a user might be visiting New York City and search for "restaurant for brunch." The set of results will typically contain a number of popular places which are nearby to the user's current location or a specified destination. Even though these search results can be heavily influenced by proximity, other factors may be important to the user as well. For example, in addition to searching for a place that is not too far away, the user may also want a place that has good reviews and that meets their budget expectations. As there may be many potential results in a close radius to the user, ranking or otherwise selecting from among the many results can be challenging, particularly when the user has not provided significant additional limitations with which the result pool may be narrowed.

Therefore, the use of additional signals concerning the user's preferences or expectations in order to provide improved and more personalized point of interest search results and other recommendations is desirable.

SUMMARY

Aspects and advantages of the present disclosure will be set forth in part in the following description, or may be obvious from the description, or may be learned through practice of embodiments of the present disclosure.

One example aspect of the present disclosure is directed to a computer-implemented method for providing point of interest search results. The method includes receiving, by one or more computing devices, a search query from a user. The method includes identifying, by the one or more computing devices, a place of accommodation at which the user is staying. The method includes identifying, by the one or more computing devices, a plurality of points of interest that satisfy the search query. The method includes determining, by the one or more computing devices, a score for each of the plurality of points of interest according to a scoring formula. The scoring formula provides the score for each of the plurality of points of interest based at least in part on a plurality of reviews of such point of interest. Reviews that were provided by reviewers that were staying at the place of accommodation at the time of review have a greater influence on the score than reviews that were provided by reviewers that were not staying at the place of accommodation at the time of review. The method includes selecting, by the one or more computing devices, one or more of the plurality of points of interest to provide as search results to the user based at least in part on the plurality of scores associated with the plurality of points of interest.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Figure 1:
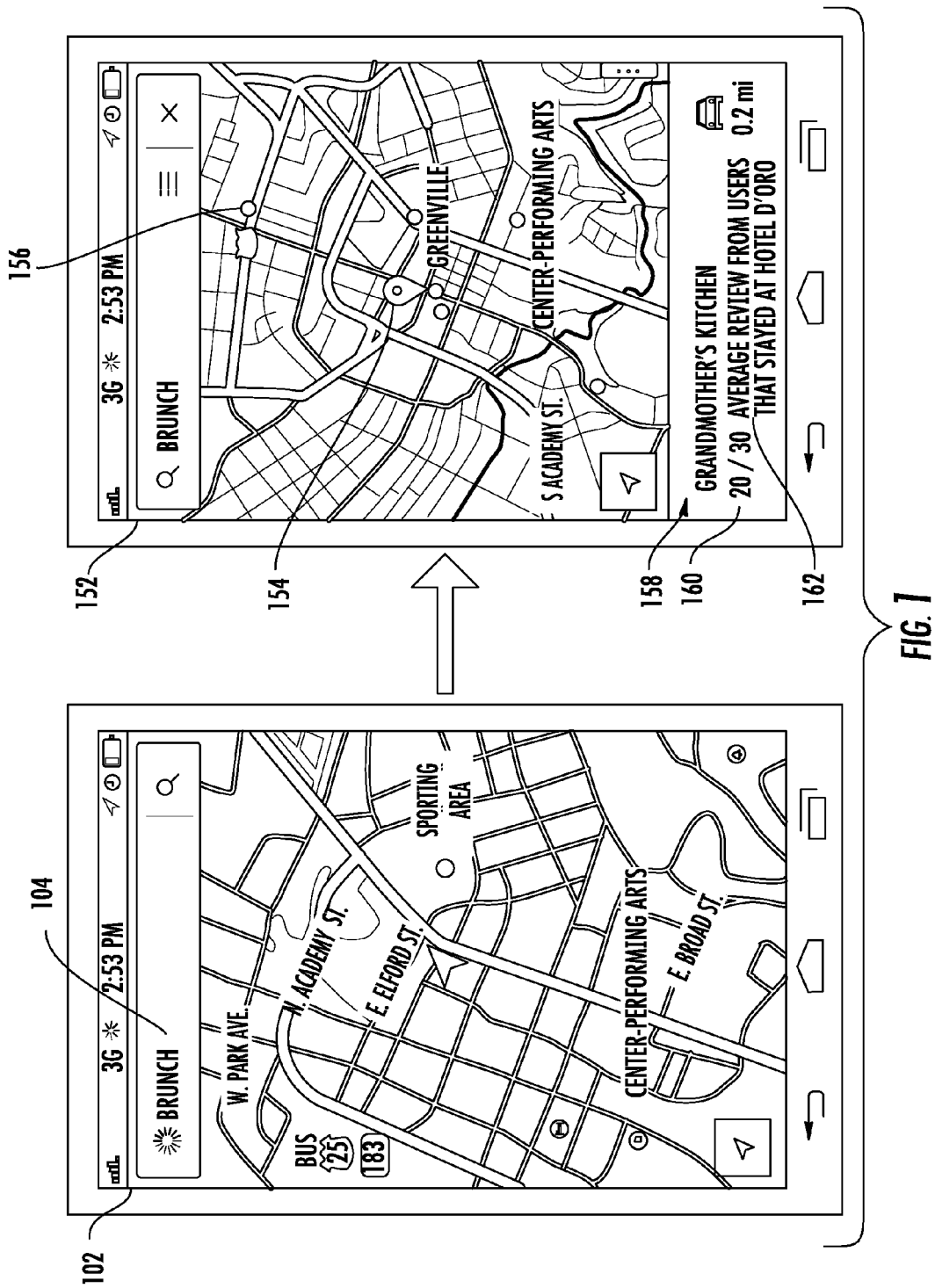
FIG. 1 depicts an example user experience of obtaining point of interest search results according to an example embodiment of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for using a place of accommodation as a signal for ranking points of interest search results and identifying relevant reviews to display. In particular, the systems and methods of the present disclosure leverage the insight that persons who share a similar itinerary (e.g. that stay or have stayed at the same place of accommodation) may often be interested in visiting similar points of interest. Therefore, for example, reviews or other data obtained from persons who are staying or have stayed at the same place of accommodation as a user performing a point of interest search can be used to influence a selection of the corresponding search results or provided reviews. In such fashion, the search results are more likely to be conveniently located and better suited to the user's preferences (e.g. budget, work versus vacation, etc.), as signaled by their place of accommodation.

In one example, candidate point of interest search results can be scored according to a scoring formula that provides a score for each point of interest based on a plurality of reviews of such point of interest. In particular, reviews that were provided by reviewers that were staying at the place of accommodation at the time of review can have a greater influence on the score than reviews that were provided by reviewers that were not staying at the place of accommodation at the time of review.

In another example, the reviews that were provided by reviewers that were staying at the place of accommodation at the time of review can be displayed or otherwise presented to the user in favor of the reviews that were provided by reviewers that were not staying at the place of accommodation at the time of review, so that the user receives the most relevant reviews.

More particularly, in some embodiments, a user can perform a search query in a mapping application or geographic information system using a client device that is signed into her user account. In particular, the search query can specify one or more criteria (e.g. search terms) or identify a desired location. The search query can be sent from the client device to a server over a network.

In response to the search query, the server can identify a plurality of points of interest (e.g. restaurants, cafes, parks, attractions, etc.). The identified points of interest can satisfy the search criteria and can be located closely to the user's current location or a location specified in the search query. Furthermore, the server can also recognize that the client device is signed into or otherwise associated with the user account and can perform aspects of the present disclosure.

More particularly, either prior or subsequent to receiving the search query, a system implementing the present disclosure can detect that the user is travelling to a new place. As an example, flight confirmation emails received by the user can be parsed to detect that the user is travelling. As another example, a change in the location of the user from a home location for greater than a given period of time (e.g. over one or more night-times) can be detected. As yet another example, a change in the location of the user from a home location for a distance that is greater than a threshold distance (e.g. 10 miles) can be detected.

Thus, in some embodiments, in order to obtain the benefits of the techniques described herein, the user may be required to allow the collection and analysis of personal information, such as email data and user location data (e.g. as indicated by location updates provided by a mobile device associated with the user). Therefore, in some embodiments, users may be provided with an opportunity to control whether programs or features collect such information. If the user does not allow collection and use of such information, then the user may not receive the benefits of the techniques described herein. In some embodiments, the user can also be provided with tools to revoke or modify consent. In addition, certain information or data can be treated in one or more ways before it is stored or used, so that personally identifiable information is removed.

After it has been determined that a user is travelling, a place of accommodation (e.g. a hotel or other lodging) at which the user is staying can be identified. As an example, confirmation emails from the place of accommodation can be parsed to identify the place of accommodation. As another example, the location of the user over one or more night-times may be reverse geocoded to identify the place of accommodation. Reverse geocoding may be performed using mapping data that correlates a geocode (e.g. latitude and longitude) with postal addresses and/or point of interest identifiers (e.g. a hotel name). As yet another example, if the user visits a place of accommodation for greater than a threshold amount of time, then it can be determined that the user is staying or has visited the place of accommodation.

Once the user's place of accommodation is identified, information describing previous interactions between other users that are staying or previously stayed at such place of accommodation can be used to enhance, customize, or otherwise influence point of interest search results, recommendations, and/or other information provided to the user (e.g. an ordering of reviews provided on a place page of a nearby point of interest).

In particular, as an example, after the plurality of points of interest are identified in response to the point of interest search requested by the user, each of the plurality of points of interest can be scored according to a scoring formula. In some embodiments, the scoring formula can consider or otherwise receive as inputs a plurality of reviews of the plurality of points of interest.

Furthermore, according to an aspect of the present disclosure, reviews that were provided by reviewers that were staying at the place of accommodation at the time of review can have a greater influence on the score than reviews that were provided by reviewers that were not staying at the place of accommodation at the time of review.

Thus, in such embodiments, scoring the plurality of points of interest can include obtaining the plurality of reviews from a database and determining whether each of the plurality of reviews was provided by a reviewer that was staying at the place of accommodation at the time of review.

More particularly, for each instance in which a review is provided by a user for which a current place of accommodation has been identified, such place of accommodation can be associated with the review. For example, the place of accommodation can be stored as a portion of a database entry representing the received review. In some embodiments, the place of accommodation information is not visible to all users, but instead is only used to identify reviews provided by users who are or were staying at a particular place of accommodation at the time of review.

In some embodiments, the scoring formula can be a weighted average that provides different weightings to a plurality of variables. The variables can be information relevant to the value of each point of interest as a search result (e.g. how well does the point of interest satisfy the search query, how close is the point of interest to the user's current location or the specified location, etc.).

As an example, the plurality of variables can include an average review score provided for the point of interest being scored by reviewers that were staying at the place of accommodation at the time of review and an average review score provided for the point of interest being scored by reviewers that were not staying at the place of accommodation at the time of review. In particular, the average review score from reviewers that were staying at the point of interest can be weighted greater than the average review score from reviewers that were not staying at the point of interest.

Other variables or filtering of data can be considered as well. For example, certain reviews may be weighted more heavily if they correspond to interactions that occurred at the same time of day as the search is being performed or interactions that included the same party size as has been identified with the user performing the search. Thus, if the user searches for "restaurants" during the morning, search results representing highly rated restaurants that were visited in the morning by other users staying at the same place of accommodation can be retrieved.

After each of the plurality of points of interest has been scored, one or more of the plurality of points of interest can be selected to provide as search results to the user based at least in part on their respective scores. For example, a predetermined number of the highest scoring points of interest can be selected and provided for display to the user as search results (e.g. as markers on a map or a textual listing of the points of interest). In such fashion, reviews or other data obtained from persons who are staying or have stayed at the same place of accommodation as a user performing a point of interest search can be used to influence a selection of the corresponding search results.

Furthermore, according to another aspect of the present disclosure, when the search results are displayed to the user, one or more of the results can be annotated with an indication that they have been reviewed by a reviewer that was staying at the place of accommodation at the time of review. As an example, the indication for each of the one or more displayed points of interest can identify a number of reviewers that reviewed such point of interest while staying at the place of accommodation ewers. Alternatively or additionally, the indication for each of the one or more displayed points of interest can identify an average review score provided by reviewers that reviewed such point of interest while staying at the place of accommodation.

Thus, in addition to influencing the selection of search results, feedback such as reviews or other data obtained from persons who are staying or have stayed at the same place of accommodation as a user can be visually displayed or otherwise provided to the user so that the user feels the recommendation and reviews are more relevant to their current situation.

In further embodiments of the present disclosure, place of accommodation can be used as a signal for selecting reviews to display to a user. In particular, in response to a user request for information about a point of interest, the user can be provided with a place page or landing page for the point of interest. The place page can be a summary of available information describing the point of interest (e.g. location, hours of operation, menu, contact information, etc.). The place page can also include one or more reviews.

According to an aspect of the present disclosure, reviews that were provided by reviewers that were staying at the user's place of accommodation at the time of review can be identified and promoted for display in favor of reviews that were provided by reviewers that were not staying at the user's place of accommodation. In such fashion, the user requesting information about the point of interest can be provided with the most relevant reviews.

Further, the reviews can be annotated with an indication that they were provided by a user who was staying at the same place of accommodation as the user. In such fashion, the user can be made aware that such reviews may be of particular relevance or importance to her. Alternatively or additionally, a summary of all of the reviews provided by reviewers that were staying at the user's place of accommodation at the time of review can be displayed.

In further embodiments of the present disclosure, alternatively or in addition to a particular place of accommodation, other factors can be considered for the purposes of scoring candidate points of interest or identifying relevant reviews to display. In particular, in some embodiments, search results or reviews provided to a particular user can be selected and customized with particular influence by reviews or other feedback or data received from other users who were travelling on a similar trip as the particular user. For example, reviews provided by other users who travelled a trip having a similar itinerary can receive emphasized consideration (e.g. a greater weighting in a scoring formula) than reviews provided by other users who travelled a trip having a dissimilar itinerary. In such fashion, recommended search results and provided reviews can better correspond to user preferences demonstrated by selection of trip itinerary.

Other trip or travel parameters can be used to identify relevant reviews and other data as well. As an example, other travel factors can include whether the user has a rental car. For example, reviews from other users that were able to navigate from a place of accommodation to a point of interest with a rental car will be more relevant to a user that is travelling with a car than a user that is relying upon public transportation. Other travel factors can include travel party size, cuisine preference (e.g. desire to experience local cuisine), speed of travel (e.g. spending one night at each of six locations versus spending six nights at one location), mode of transportation, travel destination type (e.g. historical, amusement, sporting), or other travel factors. Thus, the present disclosure can be used to provide improved search results and relevant reviews based on a variety of travel factors that indicate user preferences, including selections of places of accommodation.

In yet further embodiments of the present disclosure, the concepts of the present disclosure can be applied to points of interest in general, rather than places of accommodation in particular. As an example, if a user is currently visiting or has recently visited a particular point of interest (e.g. has recently visited a particular restaurant or retail store), then reviews from other users that visited such particular point of interest can receive increased consideration or weighting when the user performs subsequent point of interest searches. In such fashion, the systems and methods of the present disclosure can provide enhanced and personalized search results and other information based on the preferences of the user, as indicated by their recent point of interest visits.

With reference now to the FIGS., example embodiments of the present disclosure will be discussed in further detail.

FIG. 1 depicts an example user experience of obtaining point of interest search results according to an example embodiment of the present disclosure. In particular, user interface 102 of a mapping application shows a user inputting a point of interest search query. User interface 152 of the mapping application shows the user being provided with point of interest search results.

As used herein, a "point of interest" refers to any feature, landmark, place of interest, or other object or event associated with a geographic location. For instance, a point of interest can include a business, restaurant, retail outlet, coffee shop, bar, music venue, attraction, museum, theme park, arena, stadium, festival, organization, entity, or other suitable points of interest.

More particularly, as shown in user interface 102, the user has entered a search query for "Brunch" into a search box 104. The user's location is also shown in user interface 102 and may impact the results. By submitting the search query, the user may receive the information shown in user interface 152.

As shown in user interface 152, a plurality of search results have been provided, including, for example, results at locations indicated by marker 152 and marker 156. According to an aspect of the present disclosure, the results provided in user interface 152 may have been selected based at least in part on reviews or other data obtained from persons who are staying or have stayed at the same place of accommodation as the user performing the search. In particular, places that have been highly rated by others that were staying at the same accommodation as the user performing the search can be more highly rated. As used herein, a "place of accommodation" can include a hotel, motel, campground, hostel, lodging, resort, a place of relaxation (e.g. hot springs, massage business, or spa) or other places of accommodation.

A primary result is shown at marker 154. The identity of the primary result ("Grandmother's Kitchen") is shown at panel 158. Panel 158 also includes a review score 160 for the primary result and an annotation 162 that indicates that the review score 160 corresponds to an average review score from users that stayed at the same hotel as the user performing the search. The annotation 162 can indicate to the user that the primary result may be a good fit for her location and other preferences (e.g. budget), as other users on a similar trip also enjoyed the restaurant.

Figure 2:
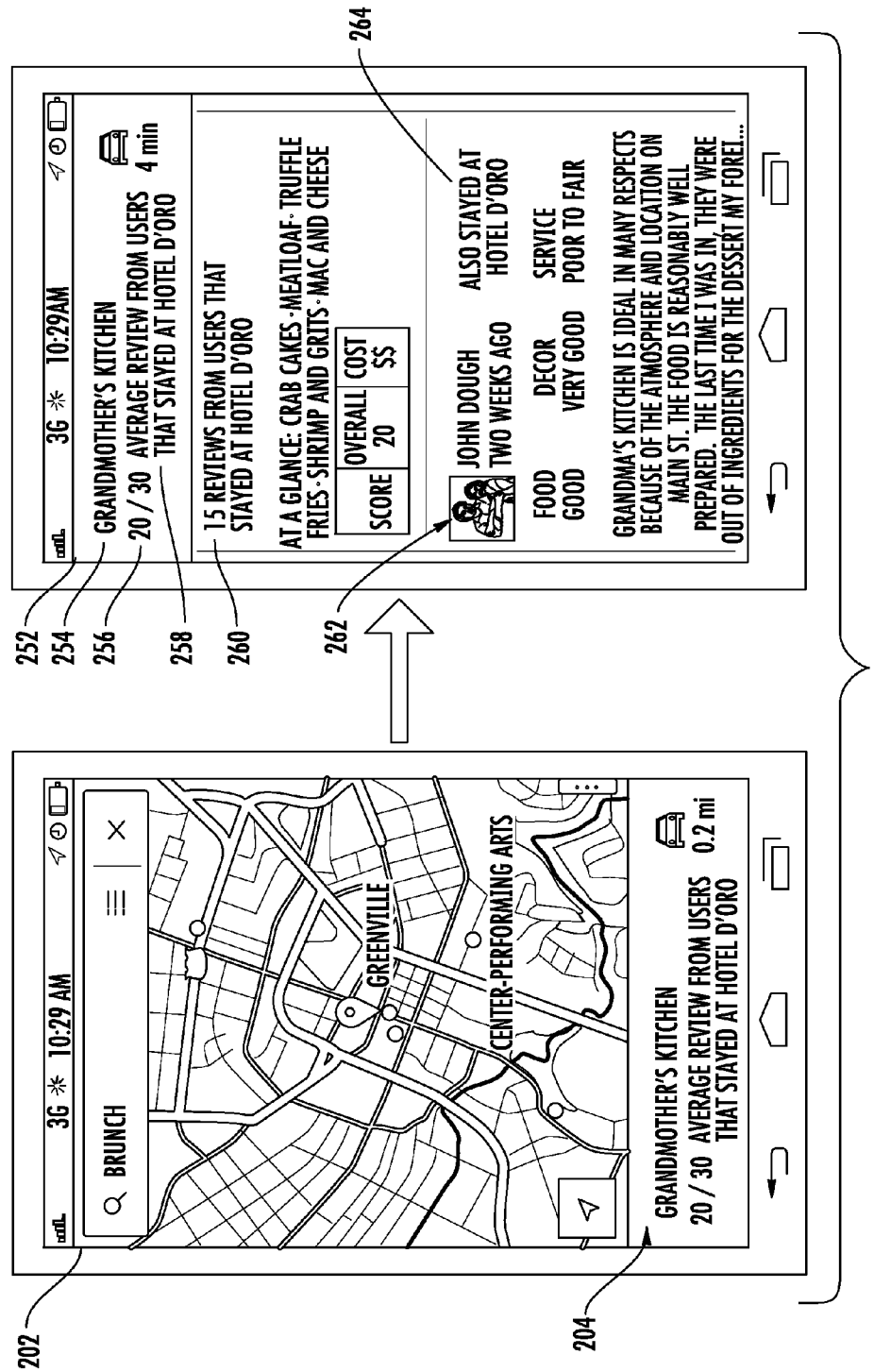
FIG. 2 depicts an example user experience of obtaining information concerning a point of interest according to an example embodiment of the present disclosure.

FIG. 2 depicts an example user experience of obtaining information concerning a point of interest according to an example embodiment of the present disclosure. In particular, user interface 202 of a mapping application shows a user being provided with point of interest search results. If the user requests to receive additional information concerning one of the identified points of interest, then the user can be shown a place page for such point of interest, as is shown in user interface 252.

More particularly, as shown in user interface 202, in response to a point of interest search, the user has been provided with a set of results. A primary result is shown in panel 204. If the user selects (e.g. by pressing on) panel 204 or drags panel 204 upwards, then the user can be presented with additional information about the primary result, as is shown in user interface 252.

User interface 252 can provide the identity 252 of the point of interest (e.g. a title or nickname). User interface 252 also includes a review score 256 for the point of interest and an annotation 258 that indicates that the review score 256 corresponds to an average review score from users that stayed at the same hotel as the user performing the search. Another annotation 260 can be included that identifies the number of reviews that are available from users that stayed at the same hotel as the user viewing the information.

One or more reviews can also be provided on the place page. For example, in section 262 a review from a user is provided. Annotation 264 is provided that indicates that the user who provided the review included in section 262 also stayed at the same hotel as the user viewing the information.

In such fashion, the user viewing the information can be given the sense that the displayed review is more relevant to her situation.

It should be appreciated that user interfaces 102, 152, 202, and 252 are provided as examples only. The present disclosure can be applied to many different situations and depicted or displayed in many different fashions. For example, the present disclosure can be applied to providing textual web search results rather than graphical map information. Further, although a primary result is specifically called out in user interface 152, in some embodiments, textual information (e.g. names, scores, distance, etc.) can be displayed or otherwise accessed for each result.

Figure 3:
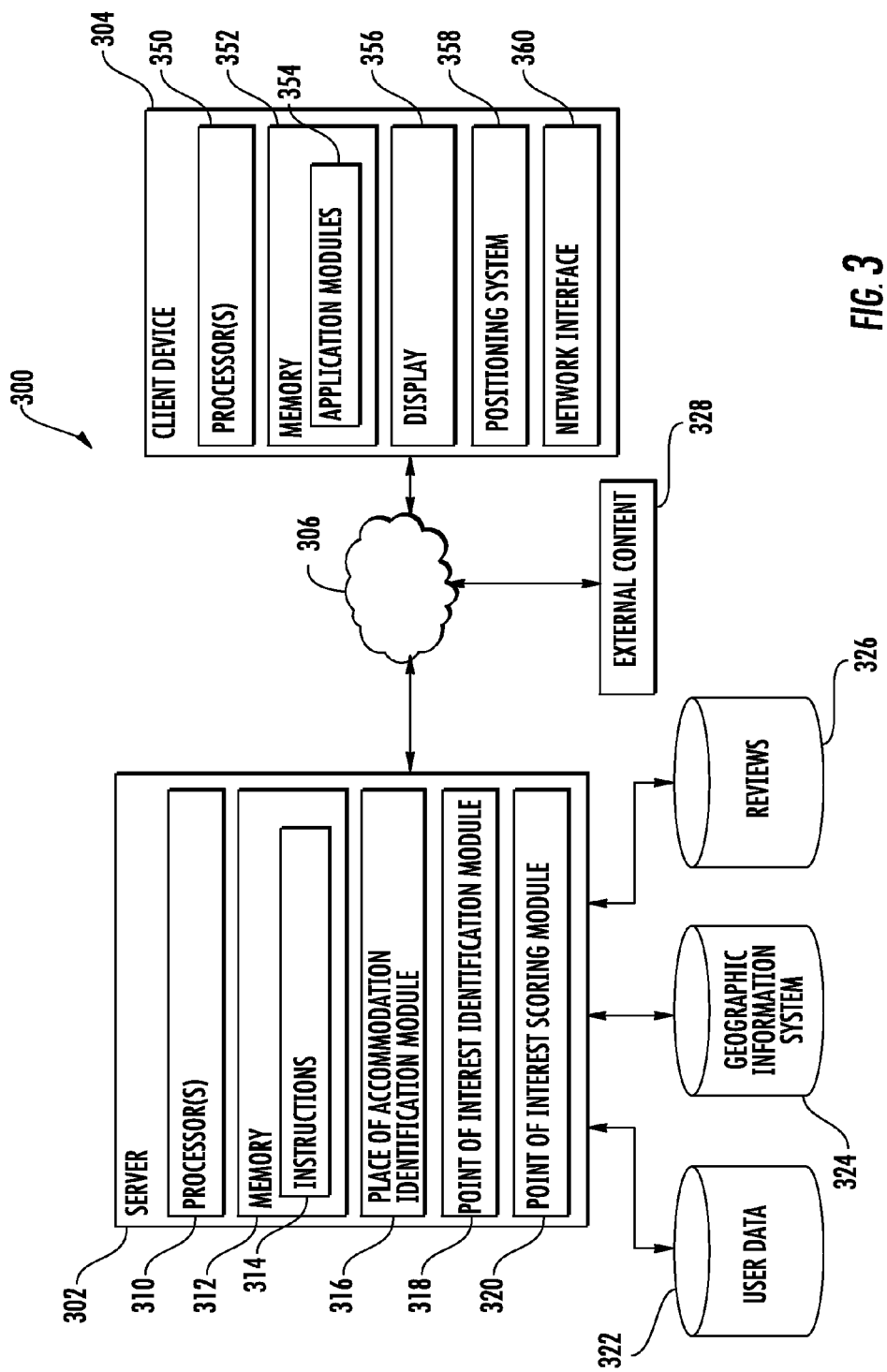
FIG. 3 depicts an example system according to an example embodiment of the present disclosure.

FIG. 3 depicts an example system 300 according to an example embodiment of the present disclosure. System 300 can include a client-server architecture, where a server 302 communicates with one or more client devices 304 over a network 306. Although one client device 304 is illustrated in FIG. 3, any number of client devices can be connected to server 302 over network 306.

Client device 304 can be, for example, a computing device having a processor 350 and a memory 352, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, or other such devices/systems. In short, client device 304 can be any computer, device, or system that can interact with the server system 302 (sending and receiving data) to implement the present disclosure.

Processor 350 of client device 304 can be any suitable processing device and can be one processor or a plurality of processors that are operably connected. Memory 352 can include any number of computer-readable instructions or other stored data. In particular, memory 352 can include, store, or provide one or more application modules 354. When implemented by processor 350, application modules 354 can respectively cause or instruct processor 350 to perform operations consistent with the present disclosure, such as, for example, running a mapping application or a browser application in order to obtain and display personalized maps. Other modules can include a virtual wallet application module, a web-based email module, a game application module, or other suitable application modules.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 304 can include a display 356. Display 356 can be any suitable component(s) for providing a visualization of information, including, for example, touch-sensitive displays (e.g. resistive or capacitive touchscreens), monitors, LCD screens, LED screens (e.g. AMOLED), or other display technologies.

Client device 304 can further include a positioning system 358. Positioning system 358 can determine a current geographic location of client device 304 and communicate such geographic location to server 302 over network 306. The positioning system 358 can be any device or circuitry for analyzing the position of the client device 304. For example, the positioning system 358 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 358 can analyze the position of the client device 304 as the user moves around in the world and provides the current location of client device 304 to the server 302 over network 306. The current location of client device 304 can be displayed on the map and can influence aspects of the present disclosure, including scores assigned to point of interest search results.

Client device 304 can further include a network interface 360. Network interface 360 can include any suitable components for interfacing with one more networks, including for example, transmitters, receivers, ports, controllers, antennas, or other suitable components.

Server 302 can be implemented using one or more suitable computing devices and can include a processor 310 and a memory 312. For example, server 302 can be one server computing device or can be a plurality of server computing devices that are operatively connected. In the instance that server 302 includes a plurality of server computing devices, such plurality of server computing devices can be organized into any suitable computing architecture, including parallel computing architectures, sequential computing architectures, or some combination thereof.

Processor 310 can be any suitable processing device and can be one processor or a plurality of processors which are operably connected. Memory 312 can store instructions 314 that cause processor 310 to perform operations to implement the present disclosure, including performing aspects of method (400) of FIG. 4 and/or method (500) of FIG. 5.

Server 302 can include one or more modules for providing desired functionality. For example, server 302 can include a place of accommodation identification module 316, a point of interest identification module 318, and a point of interest scoring module 320. Other modules to perform additional functionality can be included as well.

Server 302 can implement place of accommodation identification module 316 to identify a place of accommodation at which a user is staying. For example, place of accommodation identification module 316 can be implemented to analyze user data 322 such as a user location history, user email data, or other user data to identify a place of accommodation at which a user is staying.

Server 302 can implement point of interest identification module 318 to identify a plurality of points of interest that are responsive to a search query. For example, point of interest identification module 318 can be implemented to interact with a geographic information system 324 to identify a plurality of points of interest.

Server 302 can implement point of interest scoring module to determine or calculate a score for each of a plurality of points of interest. For example, point of interest scoring module 320 can compute the score for each point of interest according to a scoring formula or scoring metric. In some embodiments, the scoring formula can be a weighted average that provides different weightings to a plurality of variables. The variables can be information relevant to the value of each point of interest as a search result (e.g. how well does the point of interest satisfy the search query, how close is the point of interest to the user's current location or the specified location, etc.).

Server 302 can be coupled to or in communication with one or more databases, including a database providing user data 322, a geographic information system 324, a database containing reviews 326, and external content 328. Although databases 322, 324, 326, and 328 are depicted in FIG. 3 as external to server 302, one or more of such databases can be included in memory 312 of server 302. Further, databases 322, 324, 326, and 328 can each correspond to a plurality of databases rather than a single data source.

User data 322 can include, but is not limited to, email data including textual content, images, email-associated calendar information, or contact information; social media data including comments, reviews, check-ins, likes, invitations, contacts, or reservations; calendar application data including dates, times, events, description, or other content; virtual wallet data including purchases, electronic tickets, coupons, or deals; scheduling data; location data; SMS data; or other suitable data associated with a user account. Generally, according to an aspect of the present disclosure, such data can be analyzed to determine when a user is travelling and a place of accommodation at which such user may be staying.

Importantly, the above provided examples of user data 322 are simply provided for the purposes of illustrating potential data that could be analyzed, in some embodiments, to identify when a user is travelling and a place of accommodation at which such user may be staying. However, such user data is not collected, used, or analyzed unless the user has consented after being informed of what data is collected and how such data is used. Further, in some embodiments, the user can be provided with a tool to revoke or modify the scope of permissions. In addition, certain information or data can be treated in or more ways before it is stored or used, so that personally identifiable information is removed or stored in an encrypted fashion.

According to another aspect of the present disclosure, user data 322 can further store or provide a plurality of location histories respectively associated with a plurality of users. In particular, when a user elects to participate and has signed into her user account with respect to one or more of her computing devices, then such user computing device can periodically send a location update to server 302. Alternatively, the user location histories can be built and maintained by a computing system that is separate and unique from server 302 and the user location histories can simply be accessed by server 302.

For example, each location update can identify the presently active user account and a unique device identifier that corresponds to the device providing the update. Each location update can further include a location (e.g. latitude and longitude) and a timestamp identifying the date and time of day. In some implementations, location updates can further include an accuracy indicator and/or other identifying information such as an originating IP address or a WiFi or cell tower identifier.

Additional information can be used to build or supplement a user location history as well. As an example, whenever a user is logged into a user account and performs a web search or uses one or more applications, such as a mapping application, it is possible that such interaction can result in obtaining the user's location. Therefore, an entry can be formed in the associated user location history based on such interaction. As another example, if a user provides consent, transaction data from a digital wallet can be used to identify locations visited by the user.

All received location updates can be stored and associated with a particular user so that a user location history is built over time. Furthermore, in the event that the location reports provided by the user computing device simply provide a geo-location (e.g. a latitude and longitude), one or more algorithms can be applied to such location data to identify a particular point of interest that the user likely visited. Thus, the user location history for each user can provide a history of visits by such user to points of interest over time.

Geographic information system 324 can store or provide geospatial data to be used by server 302. Example geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 324 can be used by server 302 to provide navigational directions, perform point of interest searches, provide point of interest location or categorization data, determine distances, routes, or travel times between locations, or any other suitable use or task required or beneficial for performing the present disclosure.

Review database 124 can store a plurality of reviews respectively associated with a plurality of points of interest. Furthermore, information or statistics concerning the reviews can be included in the review database 124 as well. For example, the user who contributed each review and the date of contribution can be accessible by review determination system 102.

Furthermore, according to an aspect of the present disclosure, when a user that has been identified as currently staying at a particular place of accommodation provides a new review, such particular place of accommodation can be associated with the review in review database 124. For example, a portion of the database entry for the review can include data identifying the particular place of accommodation. This information is not necessarily made visible to all users, but instead can be used only to identify reviews that should receive enhanced deference when providing search results, reviews, or other recommendations for other users that are staying at the particular place of accommodation.

Computer-based system 300 can further include external content 328. External content 328 can be any form of external content including news articles, webpages, video files, audio files, written descriptions, ratings, game content, social media content, photographs, commercial offers, or other suitable external content. Server system 302 and client device 304 can access external content 328 over network 306. External content 328 can be searched by server 302 according to known searching methods and can be ranked according to relevance, popularity, or other suitable attributes, including location-specific filtering or promotion.

Network 306 can be any type of communications network, such as a local area network (e.g., intranet), wide area network (e.g., Internet), or some combination thereof and can include any number of wired or wireless links. In general, communication between the server 302 and a client device 304 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 304 can freely move throughout the world and communicate with server 302 is a wireless fashion.

Figure 4:
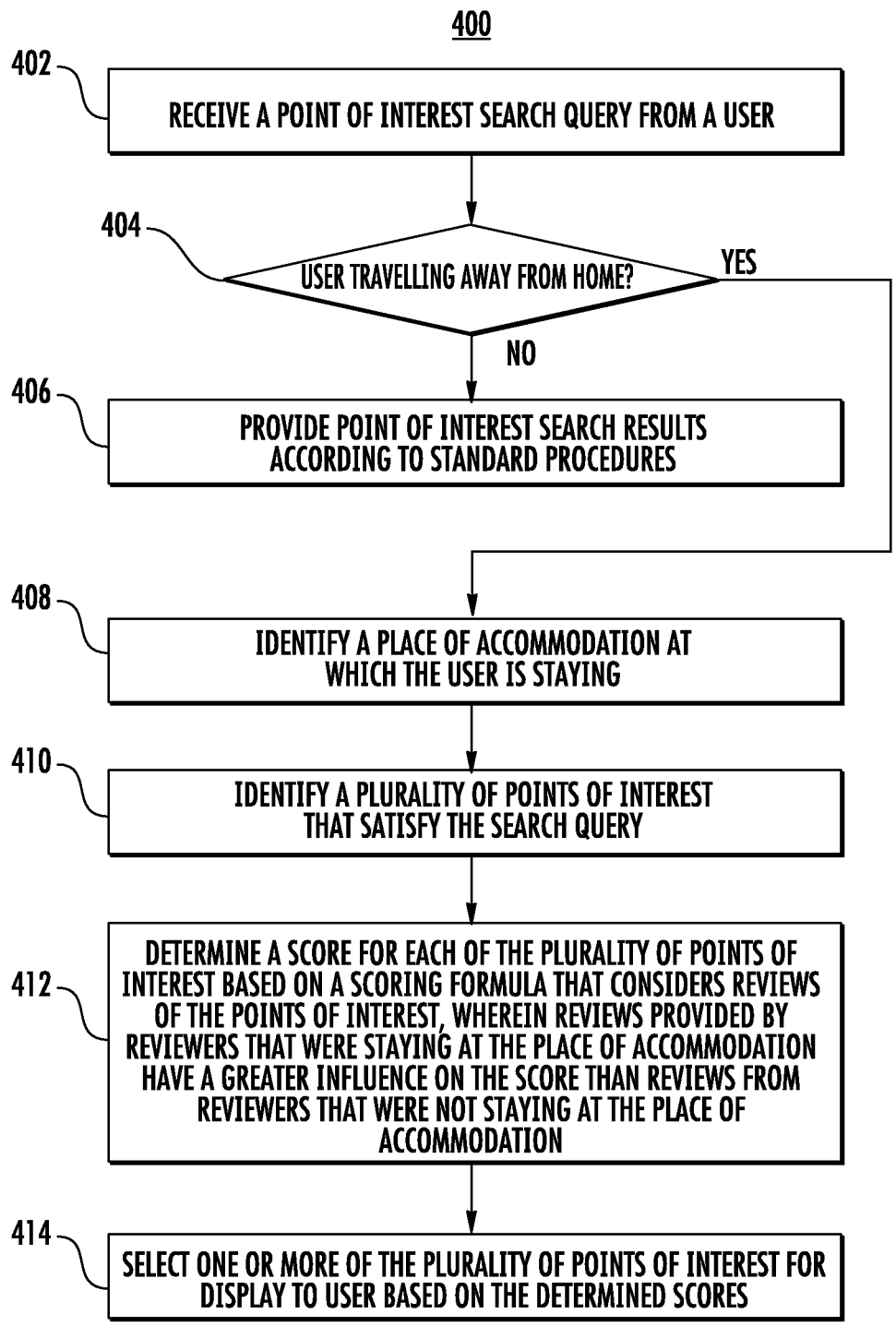
FIG. 4 depicts a flow chart of an example method for providing point of interest search results according to an example embodiment of the present disclosure.

FIG. 4 depicts a flow chart of an example method (400) for providing point of interest search results according to an example embodiment of the present disclosure. Although method (400) will be discussed with reference to system 100 of FIG. 1, method (400) can be performed by any suitable computing system.

In addition, FIG. 4 depicts steps performed in a particular order for purposes of illustration and discussion. Those of ordinary skill in the art, using the disclosures provided herein, will understand that the various steps of method (400) can be omitted, adapted, and/or rearranged in various ways without departing from the scope of the present disclosure.

At (402) a point of interest search query can be received from a user. For example, a user can perform a search query in a mapping application or geographic information system using a client device that is signed into her user account. In particular, the search query can specify one or more criteria (e.g. search terms) or identify a desired location. The search query can be sent from the client device to a server over a network.

At (404) it can be determined whether the user is travelling away from home. More particularly, either prior or subsequent to receiving the search query at (402), a system implementing the present disclosure can detect that the user is travelling to a new place. As an example, flight confirmation emails received by the user can be parsed to detect that the user is travelling. As another example, a change in the location of the user from a home location for greater than a given period of time (e.g. over one or more night-times) can be detected. As yet another example, a change in the location of the user from a home location for greater than a given distance (e.g. 10 miles) can be detected.

Thus, in some embodiments, in order to obtain the benefits of the techniques described herein, the user may be required to allow the collection and analysis of personal information, such as email data and user location data (e.g. as indicated by location updates provided by a mobile device associated with the user). Therefore, in some embodiments, users may be provided with an opportunity to control whether programs or features collect such information. If the user does not allow collection and use of such information, then the user may not receive the benefits of the techniques described herein. In some embodiments, the user can also be provided with tools to revoke or modify consent. In addition, certain information or data can be treated in one or more ways before it is stored or used, so that personally identifiable information is removed.

If it is determined at (404) that the user is not travelling away from home, then method (400) can proceed to (406) and provide point of interest search results according to standard procedures. However, if it is determined at (404) that the user is travelling away from home, then method (400) can proceed to (408).

At (408) a place of accommodation at which the user is staying can be identified. As an example, confirmation emails from the place of accommodation can be parsed to identify the place of accommodation. As another example, the location of the user over one or more night-times may be reverse geocoded to identify the place of accommodation. Reverse geocoding may be performed using mapping data that correlates a geocode (e.g. latitude and longitude) with postal addresses and/or point of interest identifiers (e.g. a hotel name).

As yet another example, if the user location history for a user indicates that they visited a place of accommodation for greater than a threshold period of time (e.g. 30 minutes), then it can be assumed that the user visited such place of accommodation. In such fashion, for example, the user can begin receiving improved search results according to the present disclosure as soon as she checks into her hotel and does not need to wait until after one or more night-times.

At (410) a plurality of points of interest that satisfy the search query can be identified. The identified points of interest can satisfy the search criteria and can be located closely to the user's current location or a location specified in the search query. As an example, the server can interact with a geographic information system or other database of geographic data to identify the points of interest.

At (412) a score for each of the plurality of points of interest can be determined based on a scoring formula. The scoring formula can base the score upon or otherwise consider a plurality of reviews of the points of interest. In particular, reviews provided by reviewers that were staying at the place of accommodation identified at (408) can have a greater influence on the score than reviews from reviewers that were not staying at the place of accommodation at the time of review.

Thus, scoring the plurality of points of interest at (412) can include obtaining the plurality of reviews from a database and determining whether each of the plurality of reviews was provided by a reviewer that was staying at the place of accommodation at the time of review.

More particularly, for each instance in which a review is provided by a user for which a current place of accommodation has been identified, such place of accommodation can be associated with the review. For example, the place of accommodation can be stored as a portion of a database entry representing the received review. In some embodiments, the place of accommodation information is not visible to all users, but instead is only used to identify reviews provided by users who are or were staying at a particular place of accommodation at the time of review.

In some embodiments, the scoring formula can be a weighted average that provides different weightings to a plurality of variables. The variables can be different items of information that are relevant to the value of each point of interest as a search result (e.g. how well does the point of interest satisfy the search query, how close is the point of interest to the user's current location or the specified location, etc.).

As an example, the plurality of variables can include an average review score provided for the point of interest being scored by reviewers that were staying at the place of accommodation at the time of review and an average review score provided for the point of interest being scored by reviewers that were not staying at the place of accommodation at the time of review. In particular, the average review score from reviewers that were staying at the point of interest can be weighted greater than the average review score from reviewers that were not staying at the point of interest.

Other variables or filtering of data can be considered as well. For example, certain reviews may be weighted more heavily if they correspond to interactions that occurred at the same time of day as the search is being performed or interactions that included the same party size as has been identified with the user performing the search. Thus, if the user searches for "restaurants" during the morning, search results representing highly rated restaurants that were visited in the morning by other users staying at the same place of accommodation can be retrieved. Other variables to consider can include the duration of the reviewer's trip or stay at the place of accommodation versus the duration of the searching user's trip or stay at the place of accommodation.

In further embodiments of the present disclosure, alternatively or in addition to a particular place of accommodation, other factors can be considered for the purposes of scoring candidate points of interest at (412). In particular, in some embodiments, scores can be computed with increased influence by reviews or other feedback or data received from other users who were travelling on a similar trip as the particular user. For example, reviews provided by other users who travelled a trip having a similar itinerary can receive emphasized consideration (e.g. a greater weighting in the scoring formula) than reviews provided by other users who travelled a trip having a dissimilar itinerary.

Other trip or travel parameters can be used to identify relevant reviews and other data as well. As an example, other travel factors can include whether the user has a rental car. For example, reviews from other users that were able to navigate from a place of accommodation to a point of interest with a rental car will be more relevant to a user that is travelling with a car than a user that is relying upon public transportation. Other travel factors can include travel party size, cuisine preference (e.g. desire to experience local cuisine), speed of travel (e.g. spending one night at each of six locations versus spending six nights at one location), travel destination type (e.g. historical, amusement, sporting), or other travel factors.

At (414) one or more of the plurality of points of interest can be selected for display to the user based at least in part on the score determined at (412). For example, a predetermined number of the highest scoring points of interest can be selected and provided for display to the user as search results (e.g. as markers on a map or a textual listing of the points of interest). In such fashion, reviews or other data obtained from persons who are staying or have stayed at the same place of accommodation as a user performing a point of interest search can be used to influence a selection of the corresponding search results.

Furthermore, according to another aspect of the present disclosure, when the search results are displayed to the user, one or more of the results can be annotated with an indication that they have been reviewed by a reviewer that was staying at the place of accommodation at the time of review. As an example, the indication for each of the one or more displayed points of interest can identify a number of reviewers that reviewed such point of interest while staying at the place of accommodation ewers. Alternatively or additionally, the indication for each of the one or more displayed points of interest can identify an average review score provided by reviewers that reviewed such point of interest while staying at the place of accommodation.

Thus, in addition to influencing the selection of search results, feedback such as reviews or other data obtained from persons who are staying or have stayed at the same place of accommodation as a user can be visually displayed or otherwise provided to the user so that the user feels the recommendation and reviews are more relevant to their current situation.

Figure 5:
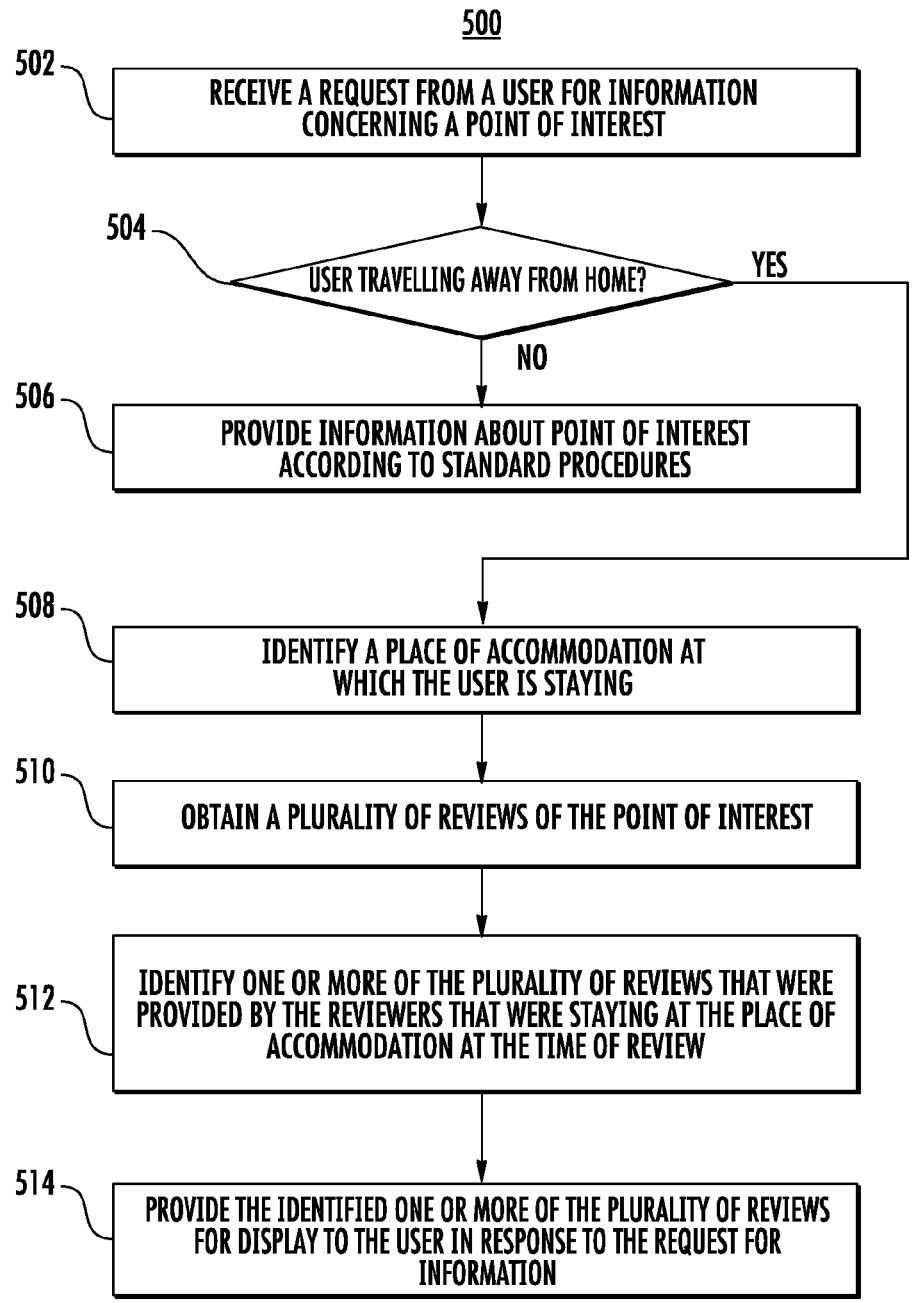
FIG. 5 depicts a flow chart of an example method for providing information concerning a point of interest according to an example embodiment of the present disclosure.

FIG. 5 depicts a flow chart of an example method (500) for providing information concerning a point of interest according to an example embodiment of the present disclosure. Although method (500) will be discussed with reference to system 100 of FIG. 1, method (500) can be performed by any suitable computing system.

In addition, FIG. 5 depicts steps performed in a particular order for purposes of illustration and discussion. Those of ordinary skill in the art, using the disclosures provided herein, will understand that the various steps of method (500) can be omitted, adapted, and/or rearranged in various ways without departing from the scope of the present disclosure.

At (502) a request for information concerning a point of interest can be received from a user. For example, a user can select a point of interest displayed on a map or click a textual indication of the point of interest, thereby requesting additional information about such point of interest. In response, the user can be taken to a place page for the point of interest or otherwise provided with additional information in a new window, tab, or other feature.

At (504) it can be determined whether the user is travelling away from home. More particularly, either prior or subsequent to receiving the search query, a system implementing the present disclosure can detect that the user is travelling to a new place. As an example, flight confirmation emails received by the user can be parsed to detect that the user is travelling. As another example, a change in the location of the user from a home location for greater than a given period of time (e.g. over one or more night-times) can be detected. As yet another example, a change in the location of the user from a home location for greater than a given distance (e.g. 10 miles) can be detected.

Thus, in some embodiments, in order to obtain the benefits of the techniques described herein, the user may be required to allow the collection and analysis of personal information, such as email data and user location data (e.g. as indicated by location updates provided by a mobile device associated with the user). Therefore, in some embodiments, users may be provided with an opportunity to control whether programs or features collect such information. If the user does not allow collection and use of such information, then the user may not receive the benefits of the techniques described herein. In some embodiments, the user can also be provided with tools to revoke or modify consent. In addition, certain information or data can be treated in one or more ways before it is stored or used, so that personally identifiable information is removed.

If it is determined at (504) that the user is not travelling away from home, then method (500) can proceed to (506) and provide the information about the point of interest according to standard procedures. However, if it is determined at (504) that the user is travelling away from home, then method (500) can proceed to (508).

At (508) a place of accommodation at which the user is staying can be identified. As an example, confirmation emails from the place of accommodation can be parsed to identify the place of accommodation. As another example, the location of the user over one or more night-times may be reverse geocoded to identify the place of accommodation. Reverse geocoding may be performed using mapping data that correlates a geocode (e.g. latitude and longitude) with postal addresses and/or point of interest identifiers (e.g. a hotel name).

As yet another example, if the user location history for a user indicates that they visited a place of accommodation for greater than a threshold period of time (e.g. 30 minutes), then it can be assumed that the user visited such place of accommodation. In such fashion, for example, the user can begin receiving more relevant reviews according to the present disclosure as soon as she checks into her hotel and does not need to wait until after one or more night-times.

At (510) a plurality of reviews of the point of interest can be obtained. For example, the server can search a review database for reviews of the point of interest.

At (512) one or more of the plurality of reviews that were provided by reviewers that were staying at the place of accommodation at the time of review can be identified. For example, certain reviews may have data associated with them that identifies that such review was provided by a reviewer who was staying at the place of accommodation. At (512) the server can analyze the reviews obtained at (510) to identify which of such reviews were provided by a reviewer who was staying at the place of accommodation.

At (514) the one or more of the plurality of reviews that were identified at (512) can be provided for display to the user in response to the request for information received at (502). In such fashion, the user requesting information about the point of interest can be provided with the most relevant reviews.

Further, the reviews can be annotated with an indication that they were provided by a user who was staying at the same place of accommodation as the user. In such fashion, the user can be made aware that such reviews may be of particular relevance or importance to her. Alternatively or additionally, a summary of all of the reviews provided by reviewers that were staying at the user's place of accommodation at the time of review can be provided at (514) for display to the user.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for providing point of interest search results, the method comprising:

receiving, by one or more computing devices, a search query from a user;

identifying, by the one or more computing devices, a place of accommodation at which the user is staying when the user is travelling away from home;

identifying, by the one or more computing devices, a plurality of points of interest that satisfy the search query;

determining, by the one or more computing devices, a score for each of the plurality of points of interest according to a scoring formula, wherein the scoring formula provides the score for each of the plurality of points of interest based at least in part on a plurality of reviews of such point of interest, and wherein reviews that were provided by reviewers that were staying at the place of accommodation at the time of review have a greater influence on the score than reviews that were provided by reviewers that were not staying at the place of accommodation at the time of review;

selecting, by the one or more computing devices, one or more of the plurality of points of interest to provide as search results to the user based at least in part on the plurality of scores associated with the plurality of points of interest; and providing, by the one or more computing devices, one or more annotated point of interest search results for display to the user, wherein the one or more annotated point of interest search results comprise one or more of the selected one or more points of interest annotated with an indication that they have been reviewed by a reviewer that was staying at the place of accommodation at the time of review.

2. The computer-implemented method of claim 1, wherein identifying, by the one or more computing devices, the place of accommodation at which the user is staying comprises:

determining, by the one or more computing devices, that the user is travelling by parsing one or more flight confirmation emails.

3. The computer-implemented method of claim 1, wherein identifying, by the one or more computing devices, the place of accommodation at which the user is staying comprises:

determining, by the one or more computing devices, that the user is travelling by detecting a change in the location of the user from a home location over one or more night-times.

4. The computer-implemented method of claim 3, wherein identifying, by the one or more computing devices, the place of accommodation at which the user is staying further comprises:

reverse geocoding, by the one or more computing devices, the location of the user over the one or more night-times to identify the place of accommodation.

5. The computer-implemented method of claim 1, wherein identifying, by the one or more computing devices, the place of accommodation at which the user is staying comprises:

parsing, by the one or more computing devices, place of accommodation confirmation emails to identify the place of accommodation.

6. The computer-implemented method of claim 1, further comprising, prior to determining the score for each of the plurality of points of interest:

obtaining, by the one or more computing devices, the plurality of reviews from a database; and determining, by the one or more computing devices, whether each of the plurality of reviews was provided by a reviewer that was staying at the place of accommodation at the time of review.

7. The computer-implemented method of claim 1, wherein determining, by the one or more computing devices, the score for each of the plurality of points of interest according to the scoring formula comprises:

determining, by the one or more computing devices for each of the plurality of points of interest, an average review score provided by reviewers that were staying at the place of accommodation at the time of review; and determining, by the one or more computing devices for each of the plurality of points of interest, the score for each of the plurality based at least in part on the average review score provided by reviewers that were staying at the place of accommodation at the time of review.

8. The computer-implemented method of claim 1, further comprising:

receiving, by the one or more computing devices, a new review of a particular point of interest from the user; and associating, by the one or more computing devices, the place of accommodation with the new review.

9. The computer-implemented method of claim 1, wherein the indication for each of the one or more displayed points of interest identifies a number of reviewers that reviewed such point of interest while staying at the place of accommodation.

10. The computer-implemented method of claim 1, wherein the indication for each of the one or more displayed points of interest identifies an average review score provided by reviewers that reviewed such point of interest while staying at the place of accommodation.

11. A system for performing point of interest searches, the system comprising:

a client device configured to transmit a search query received from a first user; and one or more servers configured to:

receive the search query from the client device;

identify a place of accommodation recently visited by the first user while the first user is traveling away from home;

identify a plurality of points of interest in response to the search query;

determine a score for each of the plurality of points of interest according to a scoring formula, wherein the scoring formula provides the score for each of the plurality of points of interest based at least in part on a plurality of reviews of such point of interest, and wherein reviews that were provided by reviewers that had visited the place of accommodation within the threshold period of time from the time of review have a greater influence on the score than reviews that were provided by reviewers that had not visited the place of accommodation within the threshold period of time from the time of review;

select one or more of the plurality of points of interest based at least in part on the plurality of scores associated with the plurality of points of interest; and provide one or more annotated point of interest search results to the client device as search results;

wherein the client device displays the one or more annotated point of interest search results to the first user, the one or more annotated point of interest search results comprising the one or more of the plurality of points of interest along with an annotation indicating that the one or more of the plurality of points of interest have been visited by one or more second users that had also visited the place of accommodation.

12. The system of claim 11, wherein the client device respectively displays one or more annotations alongside the one or more of the plurality of points of interest, wherein each of the one or more annotations provides an indication of a number of second users that interacted with the point of interest within the threshold period of time from visiting the place of accommodation or an average review score provided by such number of second users.

13. The system of claim 11, wherein:
the one or more servers are configured to access the plurality of reviews of the plurality of points of interest from a review database; and
each review in the review database that was contributed by the one of the second users that had visited the place of accommodation within the threshold period of time from the time of interaction includes information identifying the place of accommodation.

14. The system of claim 11, wherein the one or more servers are configured to identify the place of accommodation recently visited by the first user by determining that the first user was at the place of accommodation for greater than a threshold amount of time.

15. One or more non-transitory computer-readable media storing instructions that, when executed by the one or more processing devices, cause the one or more processing devices to perform operations, the operations comprising:
receiving a request from a user for information concerning a point of interest;
determining that the user is traveling away from home;
identifying a place of accommodation at which the user is staying;
obtaining a plurality of reviews of the point of interest respectively provided by a plurality of reviewers;
identifying one or more of the plurality of reviews that were provided by reviewers that were staying at the place of accommodation at the time of review;
determining a score for each of the one or more of the plurality of reviews according to a scoring formula, wherein the scoring formula provides for promoting the one or more of the plurality of reviews that were provided by reviewers that were staying at the place of accommodation in favor of reviews that were provided by reviewers that were not staying at the place of accommodation at the time of review; and
providing one or more annotated reviews for display to the user in response to the request for information concerning the point of interest, wherein the one or more annotated reviews comprise the one or more of the plurality of reviews annotated with an indication that the reviews were provided by reviewers that were staying at the place of accommodation at the time of review.

16. The non-transitory computer-readable media of claim 15, wherein providing the one or more of the plurality of reviews for display to the user comprises providing for display to the user a summary of the one or more of the plurality of reviews that were provided by reviewers that were staying at the place of accommodation at the time of review.

17. The non-transitory computer-readable media of claim 15, wherein one or more annotations are displayed when the one or more of the plurality of reviews are displayed to the user, the one or more annotations indicating that the one or more of the plurality of reviews were contributed by reviewers who were staying at the place of accommodation.

* * * * *